United States Patent
Das Sarma et al.

(10) Patent No.: US 11,227,029 B2
(45) Date of Patent: Jan. 18, 2022

(54) SCALABLE MATRIX NODE ENGINE WITH CONFIGURABLE DATA FORMATS

(71) Applicant: Tesla, Inc., Palo Alto, CA (US)

(72) Inventors: Debjit Das Sarma, San Jose, CA (US); William McGee, San Jose, CA (US); Emil Talpes, San Mateo, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/421,225

(22) Filed: May 23, 2019

(65) Prior Publication Data

US 2020/0348909 A1  Nov. 5, 2020

Related U.S. Application Data

(63) Continuation of application No. 16/403,083, filed on May 3, 2019.

(51) Int. Cl.
| | | |
|---|---|---|
| G06F 7/483 | (2006.01) | |
| G06F 17/16 | (2006.01) | |
| G06N 20/00 | (2019.01) | |
| G06F 7/499 | (2006.01) | |
| G06F 9/38 | (2018.01) | |

(52) U.S. Cl.
CPC ............. *G06F 17/16* (2013.01); *G06F 7/483* (2013.01); *G06F 7/49915* (2013.01); *G06F 9/3877* (2013.01); *G06N 20/00* (2019.01)

(58) Field of Classification Search
CPC ......... G06F 7/483; G06F 7/5443; G06F 17/16
See application file for complete search history.

(56) References Cited

U.S. PATENT DOCUMENTS

| | | |
|---|---|---|
| 2017/0221176 A1 | 8/2017 | Munteanu et al. |
| 2017/0372202 A1 | 12/2017 | Ginsburg et al. |
| 2018/0322382 A1 | 11/2018 | Mellempudi et al. |
| 2018/0336165 A1 | 11/2018 | Phelps |
| 2019/0171420 A1* | 6/2019 | Malaya ................ G06N 3/063 |
| 2019/0294964 A1* | 9/2019 | Ouchi ................. G06N 3/08 |
| 2019/0339938 A1* | 11/2019 | Wang ................. G06N 3/08 |
| 2020/0349216 A1 | 11/2020 | Sarma |

FOREIGN PATENT DOCUMENTS

| | | | |
|---|---|---|---|
| EP | 3 474 195 | 4/2019 | |
| WO | WO-2020021395 A1 * | 1/2020 | ........... G06N 3/0445 |

OTHER PUBLICATIONS

Hill et al., Oct. 14, 2017, DeftNN: addressing bottlenecks for DNN execution on GPUs via synapse vector elimination and near-compute data fission, 2017 58th Annual IEEE/ACM International Symposium on Microarchitecture, pp. 786-799.
International Search Report and Written Opinion dated Aug. 10, 2020 in PCT/US2020/020622.

* cited by examiner

*Primary Examiner* — Chuong D Ngo
(74) *Attorney, Agent, or Firm* — Knobbe, Martens, Olson & Bear, LLP

(57) ABSTRACT

A microprocessor system comprises a matrix computational unit and a control unit. The matrix computational unit includes one or more processing elements. The control unit is configured to provide a matrix processor instruction to the matrix computational unit. The matrix processor instruction specifies a floating-point operand formatted with an exponent that has been biased with a specified bias.

15 Claims, 8 Drawing Sheets

SCALABLE MATRIX NODE ENGINE WITH CONFIGURABLE DATA FORMATS

CROSS REFERENCE TO OTHER APPLICATIONS

This application is a continuation of co-pending U.S. patent application Ser. No. 16/403,083, entitled DATA PATH FOR SCALABLE MATRIX NODE ENGINE WITH MIXED DATA FORMATS filed May 3, 2019 which is incorporated herein by reference for all purposes.

BACKGROUND OF THE INVENTION

Machine learning training is a data and computational intensive operation. The process is tedious and time consuming, requiring both a significant amount of relevant training data and the computing resources to process it. Moreover, the data and computational resources only increase with the complexity of the problem being solved. To train a machine learning model, high-powered CPUs perform complex matrix operations using the training data to determine appropriate weights. To increase the speed of training, graphics processing units (GPUs) are used as an alternative or in addition to traditional CPUs. GPUs allow for some of the training to be parallelized and help to optimize certain math operations. However, GPUs are traditionally designed for processing graphics problems such as rendering three-dimensional worlds onto two-dimensional displays. When applied to machine learning, GPUs can require significant amounts of power for the amount of computational power they provide. Moreover, the data formats and data pipeline used by GPUs are designed for graphics processing and not for training machine learning models. Therefore, there exists a need for a machine learning training system that is powerful, computational, and power efficient. Such a system should support a high data bandwidth to significantly increase the amount of training data that can be processed. Moreover, the data formats and data pipeline should be optimized for the training data and resulting machine learning models.

BRIEF DESCRIPTION OF THE DRAWINGS

Various embodiments of the invention are disclosed in the following detailed description and the accompanying drawings.

DETAILED DESCRIPTION

Figure 1:
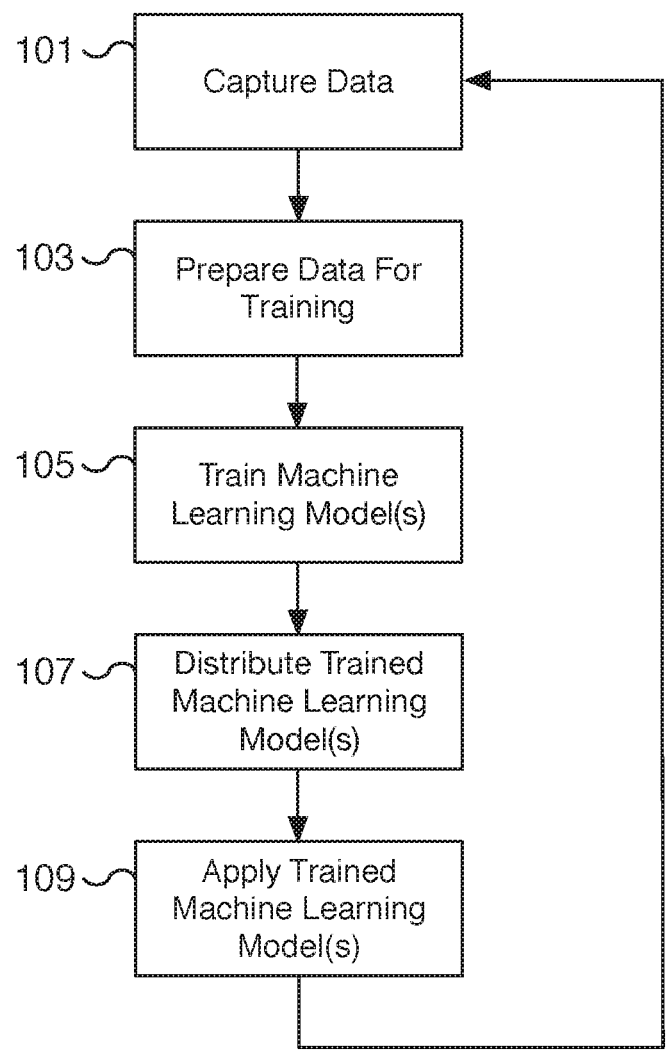
FIG. 1 is a flow diagram illustrating an embodiment of a process for training a machine learning model.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A scalable node engine with multiple matrix processors and configurable data formats is disclosed. As a core component of a training platform for machine learning models, node engines can be arranged in a network to perform training for machine learning models. As the computational and data requirements increase, the number of node engines in the network can be increased to handle the additional requirements. The disclosed node engines are highly efficient in terms of performance per $mm^2$ per watt compared to traditional CPUs and GPUs tasked for similar workloads. The node engine architecture achieves this performance improvement in part by optimizing the data formats and the data path for a machine learning workload. For example, the node engine includes multiple matrix processors that can each interleave multiple matrix operations. A node engine with a group of eight matrix processors can compute the result of a matrix multiplication every cycle. When stalled waiting for data for a first set of related matrix operations, each matrix processor can interleave a second set of related matrix operations to utilize otherwise idle computational resources. In some embodiments, the matrix operands are stored using a lower-bit floating-point format and the intermediate and final results are calculated using a higher-bit floating-point format. The lower-bit format improves the read data bandwidth of the matrix processor while the higher-bit format preserves accuracy and precision for the matrix result, for example, by preventing the loss of accuracy in quantized results. Different configurable data formats may be selected to specify different data format configurations, for example, to vary the number of bits allocated for mantissa and exponent fields. This allows the data format to be optimized based on the particular matrix operation used for a particular machine learning task. Additionally, the data formats may include a configurable bias for biasing the exponents. This improves the range of the exponents and allows a larger range to be utilized.

In some embodiments, the node engines are arranged in a mesh-like network. Each node engine includes a control unit, a memory, registers, multiple matrix processors, and a post-processing unit such as a vector computational unit. The control unit can processes customized instructions including matrix computational instructions directed to one of the multiple matrix processors and is used to synchronize results between different matrix processors and node engines. Matrix results may be stored in a register file and processed using vector operations by a post-processing unit. The software running the node engines is capable of taking large matrix operations and subdividing the problem. Different sub-components of the problem may be distributed to different node engines and to different matrix processors of each node engine. For example, two large matrices can be sliced such that each slice is optimized to the matrix size of a matrix processor. The slices can then be distributed to different matrix processors of different node engines where matrix multiplication on the slices is performed. The result of each matrix multiplication can be combined to compute the multiplication result of the original larger matrices.

In some embodiments, a microprocessor system comprises a matrix computational unit and a control unit. The matrix computational unit includes one or more processing elements. For example, the matrix computational unit includes a matrix of computational cells for determining the computational results of two elements from two operands. An 8×8 matrix computational unit includes 64 computational cells. Similarly, an M×N matrix computational unit includes M×N computational cells. The matrix computational unit is part of a matrix processor that is controlled via the control unit. In some embodiments, a control unit is configured to provide a matrix processor instruction to the matrix computational unit. For example, the control unit provides a matrix multiplication instruction to a matrix processor for the matrix computation unit to perform. The matrix processor instruction specifies a floating-point operand formatted with an exponent that has been biased with a specified configurable bias. For example, a matrix multiplication instruction specifies two floating-point matrix operands. Each element of the matrix operands is formatted using a specific floating-point format and a configurable exponent bias. Along with the matrix operands, the matrix processor instruction specifies the floating-point format the matrix elements use, such as a format allocating 1-bit for the sign bit, 4-bits for the exponent, 3-bits for the mantissa, and a particular exponent bias. In various embodiments, the bias is configurable by specifying a value corresponding to an exponent bias. In some embodiments, the bias is reconfigurable. For example, a matrix instruction may specify a new bias that is used to reconfigure the configurable bias. In some embodiments, the floating-point format supports denormal numbers to increase the number of values that can be represented.

In some embodiments, the matrix processor instruction specifies a floating-point operand formatted using a first floating-point representation format. For example, the instruction specifies an 8-bit floating-point format that allocates 4-bits for the exponent, 3-bits for the mantissa, and a single sign bit. The specified format is used for the elements of a matrix operand. The format may be selected to increase the data bandwidth going into the matrix computational unit of the matrix processor. The matrix computational unit accumulates an intermediate result value calculated using the floating-point operand, and the intermediate result value is in a second floating-point representation format. For example, intermediate results use a different floating-point format such as a 21-bit floating-point format. As another example, intermediate results may use a different floating-point format such as a 27-bit or another appropriate floating-point format. The number of bits dedicated to the intermediate results may be selected to prevent the loss of accuracy when quantizing results. A format using a larger number of bits to represent an intermediate result may be selected to prevent overflow and/or underflow errors that could result by using the first floating-point format. The matrix computational unit outputs an accumulated intermediate result as an output formatted in a third floating-point representation format. For example, multiple accumulated intermediate results may be moved from the matrix processor as a matrix result. The result may be outputted using a third format that is compatible with the bus that the matrix processor is connected to. For example, a node engine may utilize internal buses that are 64-bytes wide. The intermediate accumulated results can be output from the matrix computational unit as 16-bit floating-point values, allowing 32-elements to be moved from the matrix processor for each move instruction. An accumulated result with 64 elements can be moved from the matrix processor to a register file of the node engine using two move instructions with each instruction moving 32 elements. A move high instruction may be used to move the high 32 elements (e.g., elements 32-63) and a move low instruction may be used to move the low 32 elements (e.g., elements 0-31). In some embodiments, the move instructions are non-destructive and do not clear the contents of the source accumulators when moving a value from the source accumulators of a matrix processor to a memory location external to the matrix processor, such as an output array or register.

FIG. 1 is a flow diagram illustrating an embodiment of a process for training a machine learning model. For example, the process of FIG. 1 can be used to train a model for autonomous or driver assisted driving. As vehicles are driven, such as by a human driver, autonomously, or by a mix of both human and assisted driving, driving data can be captured. The captured data is prepared as training data and used to train a new machine learning model to improve the driving experience. The new driving experience can improve in areas such as safety, efficiency (power, time, etc.), comfort, performance, convenience, etc. Once the new model is trained and validated, the newly trained model is deployed to vehicles where it is used by one or more machine learning networks to implement the improved driving features and functionality. New features can include autonomous or assisted driving features such as autonomous lane changes, autonomous lane merging onto freeways, autonomous exiting of freeways, improved detection of obstacles and road scenarios, and autonomous navigation-based driving, among others. In various embodiments, the machine learning model may be trained on a training platform that utilizes multiple node engines and where each node engine includes multiple matrix processors and configurable data formats.

At 101, data is captured for machine learning training. In some embodiments, as a vehicle is driven, either by a human, an autonomous driving system, or both, data corresponding to vehicle driving is captured. The captured data of vehicle driving conditions may include image sensor data, vehicle operating parameters (e.g., speed, steering, etc.), vehicle type information (e.g., left-hand drive, right-hand drive, vehicle model, etc.), whether autonomous driving is enabled, the time since the last disengagement of autonomous driving, obstacles detected, driving conditions, etc. The data may be captured passively without interfering with the driving of the vehicle and without requiring driver assistance.

In various embodiments, the vehicles may be equipped with different arrangements of sensors to capture different forms of data. In some embodiments, the sensor data may be vision data, ultrasonic data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. Different arrangements of camera sensors can include a wide forward camera, a narrow forward camera, a rear view camera, forward looking side cameras, and/or rearward looking side cameras. In some embodiments, additional ultrasonic and/or radar sensors are used to capture surrounding details. For example, twelve ultrasonic sensors may be affixed to the vehicle to detect both hard and soft objects. An additional forward-facing radar can also be utilized to capture data of the surrounding environment. In various embodiments, radar sensors are able to capture surrounding detail despite heavy rain, fog, dust, and other vehicles. The various sensors are used to capture the environment surrounding the vehicle and the captured data is stored for consideration as training data for a deep learning network.

Once captured, the captured data from one or more vehicles is transferred to a machine learning training platform. For example, a vehicle with wireless connectivity, such as a cellular or WiFi connection, can transfer the data wirelessly to a machine learning training platform. As another option, captured data can be downloaded from a vehicle when the vehicle is being serviced by technicians. In various embodiments, the captured data from multiple vehicles, such as a fleet of vehicles, is aggregated at a machine learning training platform and used as at least one of the sources for training data.

At 103, the captured data is prepared for training a machine learning model. The data captured from vehicles at 101 is prepared as training data. In some scenarios the data is separated into training and validation data. The preparation of the data may include selecting (or culling) the captured data to identify particularly good training data. In some embodiments, the data is annotated to identify features for training. For example, lane markers, traffic lights, traffic signs, vehicles, pedestrians, etc. may be annotated to enhance the usefulness of the training data as part of data preparation. As another example, the data may be converted to different formats or pre-processed as part of the preparation process. In some embodiments, the data may be converted from a source data format to a format compatible with a matrix processor. For example, data captured as fixed-point data may be converted to floating-point data for increased precision.

At 105, a machine learning model is trained. Using the training data prepared at 103, one or more machine learning models are trained. The training may utilize both a training and a validation data set. In some embodiments, the training utilizes a machine learning platform that is made up of multiple node engines and where each node engine includes multiple matrix processors. By utilizing multiple node engines, for example, organized into a mesh or another appropriate architecture, a complex machine learning training problem can be parallelized and performed more quickly and efficiently. Similarly, since each node engine includes multiple matrix processors, each node can perform multiple matrix operations in parallel. In some embodiments, by operating multiple matrix processors in parallel, a node engine can output the result of a matrix multiplication every clock cycle. The delay waiting for data reads is significantly reduced, the delay between matrix multiplication results is significantly reduced, and the performance bandwidth is significantly increased.

The result of the training is one or more trained machine learning models. In some embodiments, multiple models are trained, each for potentially different neural networks. For example, one machine learning model may be trained to utilize as input the sensor data from a forward facing camera and another model may be trained to utilize as input the sensor data from a side-facing ultrasonic sensor.

At 107, the trained machine learning model is distributed. For example, the trained model is distributed to and installed onto vehicles. The model may be installed via an over-the-air update, by a technician while servicing a vehicle, or another means. In certain situations, the model is packaged in a data format for easy installation on a vehicle. For example, the model may be compressed to minimize the time and bandwidth required to transmit the model to a vehicle. In some embodiments, multiple models, for example, each for a different neural network engine running on the vehicle, may be packaged together and transmitted as a single package to the vehicle.

At 109, the trained machine learning model is applied. For example, a new model is utilized by a convolutional neural network on the vehicle to process sensor data and to implement autonomous driving or driver assisted features. In some embodiments, more than one model is applied and/or more than one neural network is utilized. For example, on some vehicles, multiple neural networks are utilized to process the different data from different sensors. Once the new model is utilized, data can be captured reflecting the performance of the new model and used for future training. The process of FIG. 1 can be utilized to continuously improve the performance of a machine learning network. In this manner, the processing loops back to 101 where data is captured. The data can be analyzed to identify difficult use cases for the currently deployed model and the corresponding captured data can be utilized for future training.

Figure 2:
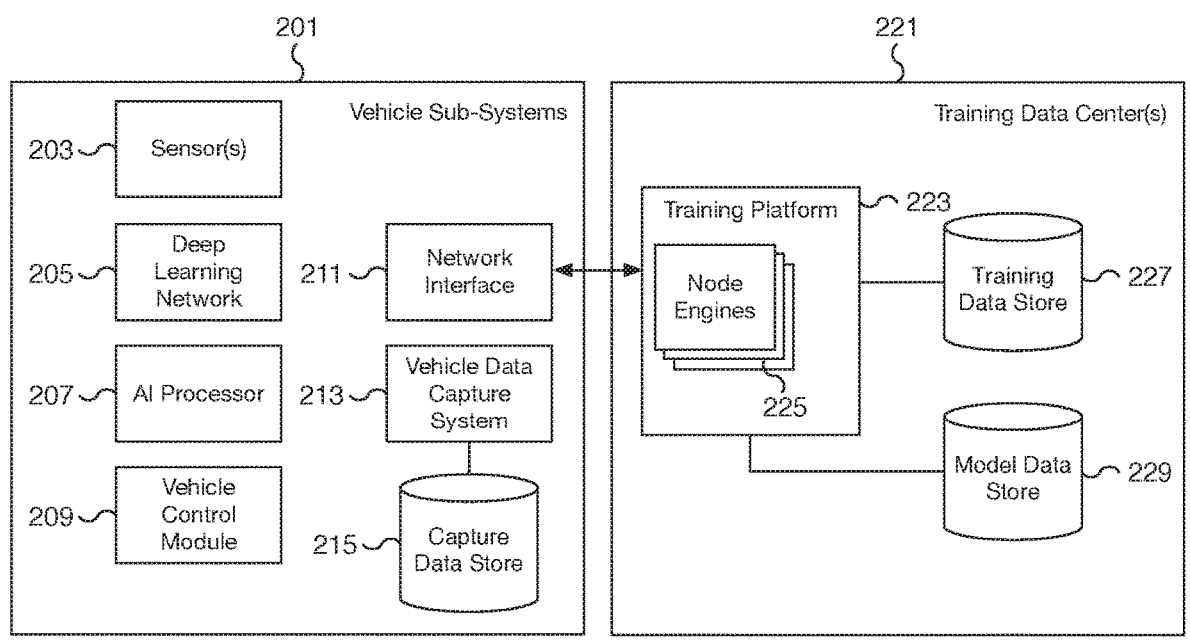
FIG. 2 is a block diagram illustrating an embodiment of a system for training a machine learning model.

FIG. 2 is a block diagram illustrating an embodiment of a system for training a machine learning model. Using the training system of FIG. 2, a machine learning model can be trained for implementing autonomous and/or driver assisted driving functionality. In some embodiments, the training system of FIG. 2 is used to perform the process of FIG. 1. In the example shown, the training system utilizes certain training-related sub-systems of vehicle sub-systems 201 located on a vehicle. The training related sub-systems communicate with the server-side of the training system located in one or more training data centers 221. Vehicle sub-systems 201 includes sensors 203, deep learning network 205, AI processor 207, vehicle control module 209, network interface 211, vehicle data capture system 213, and capture data store 215. Additional vehicle sub-systems may exist, for example, to perform other functionality, but are not shown. Training data center(s) 221 includes training platform 223, training data store 227, and model data store 229. Training platform 223 includes at least one or more node engines 225. The node engines are connected (e.g., in a mesh-like network) to perform parallelized processing for machine learning training. In some embodiments, training platform 223, training data store 227, and model data store 229 are located in a single data center but may also be distributed or replicated across multiple data centers.

In some embodiments, a vehicle (not shown) includes vehicle sub-systems 201 to implement autonomous and driver-assisted functionality and to capture data that can be used to train one or more machine learning models for implementing and/or improving the functionality and/or new features. In various embodiments, the different vehicle sub-systems may be communicatively connected. For example, sensor data from sensors 203 is fed to vehicle data capture system 213 for storage in capture data store 215. The captured data is sent to training platform 223 via network interface 211. As another example, sensor data from sensors 203 is fed to deep learning network 205 running on AI processor 207. The output of deep learning network 205 running on AI processor 207 is fed to vehicle control module 209. In various embodiments, network interface 211 is a wireless network interface such as one that includes WiFi and/or cellular network connectivity. Network interface 211 is used to communicate with remote servers, to make phone calls, to send and/or receive text messages, to transmit sensor data to training platform 223, etc. In some embodiments, vehicle sub-systems 201 may include additional or fewer sub-systems as appropriate. For example, in some embodiments, an image pre-processor (not shown) is utilized for pre-processing captured sensor data. As another example, in some embodiments, a post-processing component (not shown) is used to perform post-processing on the output of deep learning network 205 before the output is provided to vehicle control module 209. In some embodiments, a trigger classifier component (not shown) is used to identify driving data as potential training data.

In some embodiments, sensors 203 include one or more sensors. The sensors 203 may be affixed to a vehicle, at different locations of the vehicle, and/or oriented in one or more different directions. For example, sensors 203 may be affixed to the front, sides, rear, and/or roof, etc. of the vehicle in forward-facing, rear-facing, side-facing, etc. directions. In some embodiments, sensors 203 may be image sensors such as high dynamic range cameras. In some embodiments, sensors 203 include non-visual sensors. Sensors 203 may include radar, LiDAR, and/or ultrasonic sensors, among others. In certain embodiments, sensors 203 are not mounted to the vehicle with vehicle control module 209. For example, sensors 203 may be mounted on neighboring vehicles and/or affixed to the road or environment and are included as part of a system for capturing sensor data.

In some embodiments, deep learning network 205 is a deep learning network for implementing autonomous vehicle control. For example, deep learning network 205 may be an artificial neural network such as a convolutional neural network (CNN) that is trained using sensor data and its output is provided to vehicle control module 209. The machine learning model used by deep learning network 205 may be trained using the system of FIG. 2.

In some embodiments, artificial intelligence (AI) processor 207 is a hardware processor for running deep learning network 205. In some embodiments, AI processor 207 is a specialized AI processor for performing inference using a convolutional neural network (CNN) on sensor data. AI processor 207 may be optimized for the bit depth of the sensor data and/or optimized for deep learning operations such as neural network operations including convolution, dot-product, vector, and/or matrix operations, among others. In some embodiments, AI processor 207 is implemented using a graphics processing unit (GPU). In various embodiments, AI processor 207 is coupled to memory that is configured to provide the AI processor with instructions which when executed cause the AI processor to perform deep learning analysis on the received input sensor data and to determine a machine learning result used to at least in part autonomously operate a vehicle.

In some embodiments, vehicle control module 209 is utilized to process the output of artificial intelligence (AI) processor 207 and to translate the output into a vehicle control operation. In some embodiments, vehicle control module 209 is utilized to control the vehicle for autonomous driving and can adjust the speed and/or steering of the vehicle. For example, vehicle control module 209 may be used to control a vehicle by braking, steering, changing lanes, accelerating, and merging into another lane, etc. In some embodiments, vehicle control module 209 is used to control vehicle lighting such as brake lights, turns signals, headlights, etc. In some embodiments, vehicle control module 209 is used to control vehicle audio conditions such as the vehicle's sound system, playing audio alerts, enabling a microphone, enabling the horn, etc. In some embodiments, vehicle control module 209 is used to control notification systems including warning systems to inform the driver and/or passengers of driving events such as a potential collision or the approach of an intended destination. In some embodiments, vehicle control module 209 is used to adjust sensors such as sensors 203 of a vehicle. For example, vehicle control module 209 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In various embodiments, vehicle control module 209 is used to implement self-driving and/or driver-assisted control of a vehicle.

In some embodiments, network interface 211 is a communication interface for sending and/or receiving data including captured sensor data. In various embodiments, a network interface 211 includes a cellular or wireless interface for interfacing with remote servers, such as training platform 223, to connect and make voice calls, to send and/or receive text messages, to transmit sensor data, to receive updates to the autonomous driving system including newly training machine learning models, etc. For example, network interface 211 may be used to receive an update for the instructions and/or operating parameters for sensors 203, deep learning network 205, AI processor 207, vehicle control module 209, and/or vehicle data capture system 213. For example, a machine learning model of deep learning network 205 may be updated using network interface 211. As another example, network interface 211 may be used to update firmware of sensors 203 and/or operating parameters of vehicle data capture system 213 such as filters and/or parameters for determining the type and amount of data to capture.

In some embodiments, vehicle data capture system 213 and capture data store 215 are used for capturing and storing data associated with vehicle driving conditions. The data captured by vehicle data capture system 213 is stored in capture data store 215. Capture data store 215 may be implemented using any appropriate data store such as a hard drive, non-volatile memory, etc. In some embodiments, capture data store 215 is implemented using a database, a file system, or another means for organizing the data. The captured data of vehicle driving conditions may include image sensor data, vehicle operating parameters (e.g., speed, steering, etc.), vehicle type information (e.g., left-hand drive, right-hand drive, vehicle model, etc.), whether autonomous driving is enabled, the time since the last disengagement of autonomous driving, obstacles detected, driving conditions, etc. The data may be captured passively without interfering with the driving of the vehicle and without requiring driver assistance. Data captured by vehicle data capture system 213 includes data captured from sensors 203.

In some embodiments, vehicle data capture system 213 communicates with training platform 223 via network interface 211. Network interface 211 may be a wireless network such as a WiFi and/or cellular network. Vehicle data capture system 213 utilizes network interface 211 to transmit captured data stored in capture data store 215 to training platform 223. In some embodiments, network interface 211 is utilized to download a trained machine learning model for installation in deep learning network 205 running on the vehicle.

In the example of FIG. 2, the server-side components of the training system are located in one or more data centers of training data center(s) 221 and include training platform 223, training data store 227, and model data store 229. Training platform 223 includes one or more computer servers for receiving captured data from vehicle data capture system 213. Training platform 223 is communicatively connected to vehicle data capture system 213 via wireless network interface 211 through a computer network, such as a wired or optical network, of training data center(s) 221. Training platform 223 further includes one or more node engines 225. For example, multiple node engines 225 may be connected in a mesh network. Training platform 223 receives captured data from vehicle data capture system 213, processes the data into usable training (and validation) data, and utilizes node engines 225 for training one or more new machine learning models. Training data store 227 is used for storing the received captured data from one or more vehicles. In some embodiments, processed captured data used as training data including annotated data is stored in training data store 227. Once training is completed, model data store 229 is used to store the trained machine learning model. For example, different versions of trained machine learning models may be stored in model data store 229 and utilized to determine the relative functionality of the different models and to identify areas of improvement. In some embodiments, one or more data stores are used to implement training data store 227 and model data store 229.

In some embodiments, node engines 225 includes multiple connected nodes that can be used to parallelize computational tasks. Each connected node includes at least one, and possibly more than one, matrix processor. For example, a single node may include eight matrix processors, each capable of determining at least one matrix multiplication result. In some embodiments, a matrix multiplication result takes a single matrix processor at least a minimum number of clock cycles to compute. By scaling each node to include multiple matrix processors, after an initial delay corresponding to the minimum number of clock cycles to compute a matrix multiplication, a node can output the result of one matrix multiplication each clock cycle. For example, in the event a matrix multiplication takes eight clock cycles to complete, after an initial delay of seven clock cycles, a node with eight matrix processors can determine the result of a matrix multiplication every clock cycle. In various embodiments, the throughput is further determined by memory access including the latency in accessing matrix operands. In various embodiments, the node engines are able to perform matrix computations using a variety of number formats. For example, a node can utilize fixed-point and floating-point number formats. With respect to floating-point formats, the node is configurable to operate in multiple formats such as 8-bit, 16-bit, and 32-bit formats. For each bit-depth, one or more different formats may be selected. Depending on the computational goal, a different format may be used to represent a number value. A format may be selected to allocate more precision to the mantissa of a floating-point number and another format may be selected to allocate more precision to the exponent of a floating-point number. In some embodiments, the floating-point formats utilize a configurable bias to further customize computational operations. The configurability of number formats allows the training system to target different machine learning operations, for example, based on expected input, intermediate, and output values. In various embodiments, the configurability of the node including support for multiple floating-point formats and floating-point formats using configurable biases greatly improves the bandwidth and performance for matrix computational operations without sacrificing precision and accuracy. Similarly, the power consumption and efficiency is also significantly improved.

Figure 3:
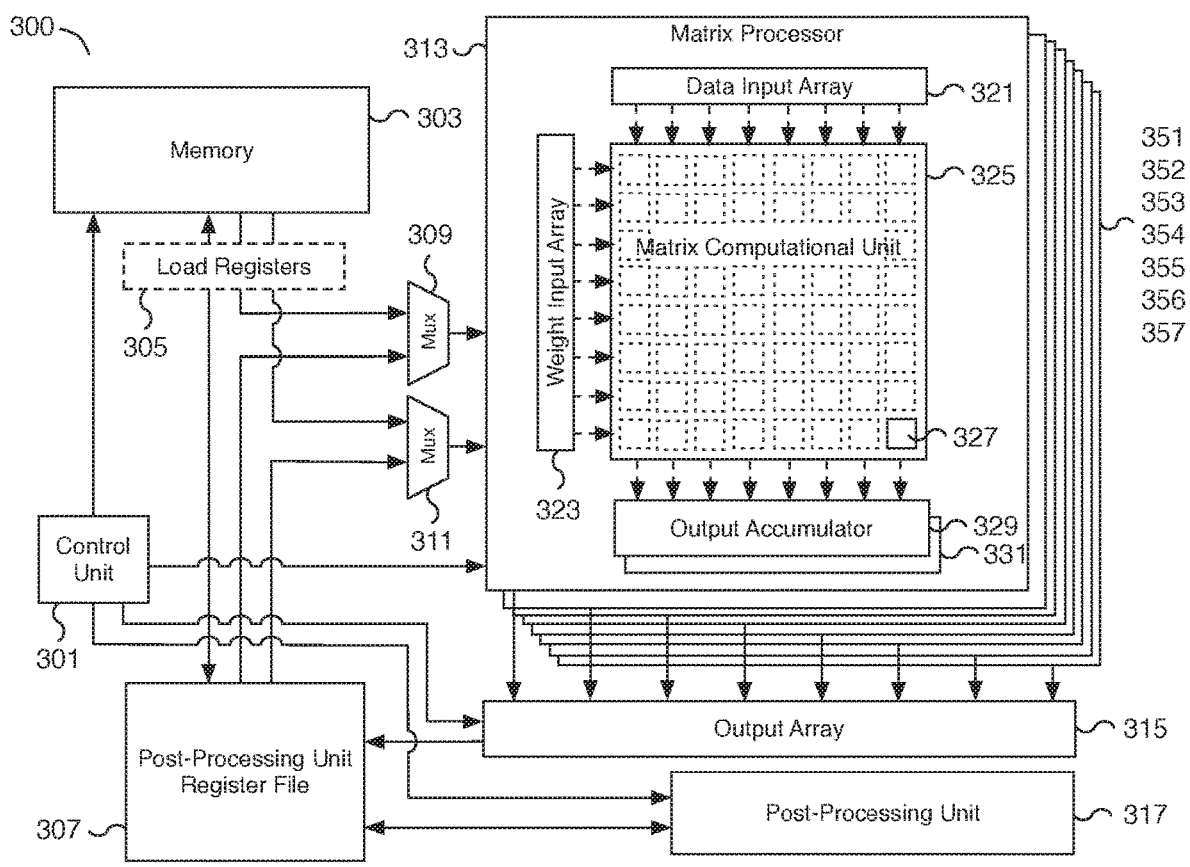
FIG. 3 is a block diagram illustrating an embodiment of a node engine for performing matrix computations.

FIG. 3 is a block diagram illustrating an embodiment of a node engine for performing matrix computations. In the example shown, node engine 300 includes control unit 301, memory 303, load registers 305, post-processing unit register file 307, multiplexers 309 and 311, matrix processors 313 and 351-357, output array 315, and post-processing unit 317. In various embodiments, a node engine may include multiple matrix processers to compute multiple matrix operations in parallel. In the example shown, node engine 300 includes eight matrix processors 313 and 351-357. Each matrix processor includes a data input array, a weight input array, multiple output accumulators, and a matrix computational unit. In the example shown, matrix processor 313 includes data input array 321, weight input array 323, and two output accumulators 329 and 331. The data and weight input arrays feed input to matrix computational unit 325. For example, the data in an input array (e.g., data input array 321 and/or weight input array 323) is shifted by a certain number of bytes (e.g., eight bytes) to feed matrix computational unit 325 over multiple cycles (e.g., eight successive cycles). In some embodiments, each matrix processor includes a single data input array and a single weight input array. Matrix computation unit 325 includes a matrix of computational cells such as computational cell 327. An M×N dimension matrix computational unit includes M×N computational cells. Each input array is sized to fit an entire input matrix and each output accumulator is sized to fit an entire matrix result. In some embodiments, the node engine supports multiple floating-point formats including the 8-bit floating-point formats 400 and 410 of FIG. 4 and the 21-bit floating-point format 500 of FIG. 5. In some embodiments, node engine 300 is used to perform the processes of FIGS. 1, 6, 7, and/or 8.

In some embodiments, node engine 300 may include additional components and additional control lines that are not shown. For example, node engine 300 may include additional registers such as scalar registers, one or more memory cache(s), data formatters for formatting values for the matrix processors, and additional control lines from control unit 301 to sub-components such as multiplexers 309 and 311 and matrix processors 351-357, as a few examples. In some embodiments, certain registers (not shown) are dedicated for storing configurable parameters such as number formats and configurable biases for floating-point numbers. In some embodiments, the buses that connect the different components of node engine 300 are wide-data buses. The size of the bus may be selected to optimize for transferring matrix values. For example, the buses may all be 64-bytes wide. This allows an 8×8 matrix of 64 1-byte elements to be transferred from memory, to a register, to the matrix processor, etc., as a contained unit.

In the example shown, control unit 301 is communicatively connected to one or more components of node engine 300 including memory 303, matrix processor 313, output array 315, and post-processing unit 317. Although not shown, control unit 301 is also communicatively connected to each of the remaining matrix processors 351-357. In various embodiments, control unit 301 is used to synchronize the processing of computational operations including matrix operations and post-processing operations (such as vector operations) and/or access of memory and registers. For example, control unit 301 sends signals to matrix processor 313 to schedule a matrix computation instruction and may monitor a ready signal from matrix processor 313 to indicate when a new instruction can be received and/or when a matrix operation has completed and a matrix result is ready.

In some embodiments, memory 303 is a memory module for storing the input operands and output results of matrix computations and post-processing computations. Memory 303 may include one or more caches (not shown). In the example shown, memory 303 is connected to load registers 305, multiplexers 309 and 311, and post-processing unit register file 307. Additional or fewer connections are possible depending on the flexibility needed in storing and retrieving data to and from memory. As shown, data can be read to and from memory into and from load registers 305 and post-processing unit register file 307. The connection to the registers allows data values to be quickly stored in a register, for example, as arguments for a matrix or vector computation. Memory 303 is also connected to multiplexers 309 and 311 so that input matrices can be retrieved from memory. In some embodiments, memory access to memory 303 is controlled by a memory arbiter (not shown) to optimize memory requests, for example, by queuing memory requests and prioritizing certain memory reads over others. In some embodiments, memory 303 is static random access memory (SRAM).

In some embodiments, node engine 300 includes registers such as load registers 305 and post-processing unit register file 307. These registers may be used to optimize memory access. As a few examples, the registers may be used to store values retrieved from memory 303, to store values prior to writing the values into memory 303, to store input and output values of a matrix processor, and to store input and output values of a post-processing unit. In some embodiments, post-processing unit register file 307 is a register file for post-processing unit 317 and is compatible with different lane configurations (e.g., 64, 32, and/or 16 lane configurations) of post-processing unit 317. For example, the registers of post-processing unit register file 307 can be addressed using various byte formats such as 1-byte, 2-byte, and 4-byte values. In some embodiments, each register is 64-bytes in size and can store 64 1-byte elements, 32 2-byte elements, or 16 4-byte elements. In various embodiments, the data formats can be configured and include various 8-bit, 16-bit, and 32-bit floating-point formats.

In some embodiments, multiplexers are used to select the source of input operands to a matrix processor. In the example shown, multiplexers 309 and 311 are used to select the source for a data input matrix and weight input matrix for matrix processor 313. Depending on the control signal received at each multiplexer, data can be sourced from memory 303 or post-processing unit register file 307. In some embodiments, data sourced from memory 303 is retrieved via a register of load registers 305. In some embodiments, multiplexers 309 and 311 are also used to select the data input matrix and weight input matrix for matrix processors 351-357. By offsetting the processing of the multiple matrix processors of a node engine, a single pair of multiplexers is used to select the input for all matrix processors of the node engine. In various embodiments, multiplexers 309 and 311 are used to control which matrix processor receives which matrix operands. Depending on the configuration, a single matrix processor, a subset of all matrix processors, or all matrix processors receive the selected matrix operands. In the alternative embodiments, node engine 300 includes additional multiplexers (not shown) dedicated to each of matrix processors 351-357.

In some embodiments, matrix processor 313 receives a matrix operation instruction and performs a matrix computation such as a matrix multiplication. For each matrix instruction, matrix processor 313 stores one or more matrix operands in one or more input arrays. For example, a data matrix is stored in a data input array, such as data input array 321, and a weight matrix is stored in a weight input array, such as weight input array 323. In various embodiments, the matrix operands are a pair of data and weight matrices, a pair of data and gradient matrices, a pair of weight and gradient matrices, or another appropriate pair of matrix operands. In various embodiments, matrix processor 313 is used to compute multiple related matrix computations as part of the process for computing a matrix multiplication of matrices that are too large to fit in input arrays 321 and 323 of matrix processor 313. The results of the related matrix computations are combined as part of the process of computing the matrix multiplication of the larger matrices. In various embodiments, matrix processor 313 interleaves multiple matrix operations (related or not). For example, matrix processor 313 can interleave performing one or more related matrix operations on a first pair of matrices with performing one or more related matrix operations on a second pair of matrices. For example, matrix processor 313 can perform a matrix multiplication on matrices $W_1$ and $D_1$ that are part of (e.g., slices of) larger matrices $W_A$ and $D_A$, respectively, and subsequently perform a matrix multiplication on matrices $W_2$ and $G_2$ that are part of (e.g., slices of) larger matrices $W_B$ and $G_B$, respectively. The matrix multiplication results of matrices $W_1$ and $D_1$ are partial results that are used for computing the matrix multiplication of larger matrices $W_A$ and $D_A$ and the matrix multiplication results of matrices $W_2$ and $G_2$ are partial results that are used for computing the matrix multiplication of larger matrices $W_2$ and $G_2$. The input matrices $W_1$ and $D_1$ and input matrices $W_2$ and $G_2$ are stored in a pair of weight and data input arrays, such as arrays 321 and 323. In some embodiments, separate output accumulators 329 and 331, respectively, are used to accumulate the intermediate and/or final results of $W_1 * D_1$ and the intermediate and/or final results of $W_2 * G_2$. For example, output accumulator 329 is used to accumulate the intermediate and/or final results of the matrix multiplications associated with matrices $W_1$ and $D_1$ and output accumulator 331 is used to accumulate the intermediate and/or final results of the matrix multiplications associated with matrices $W_2$ and $G_2$.

In some embodiments, data input array and weight input array are sized to fit an entire matrix in linearized form. For example, a matrix processor capable of performing a matrix multiplication on two matrices sized M×N and N×O has an input array of size M×N elements and another input array of size N×O elements for receiving the corresponding M×N and N×O input matrices. In some embodiments, a matrix processor performs computations on two 8×8 matrices and weight input array and data input array are each sized to receive 64 elements. Similarly, output accumulators are sized to store an entire result matrix. An output accumulator used for storing the result of a matrix multiplication between two matrices sized M×N and N×O is sized to receive M×O elements. In some embodiments, a matrix processor performs computations on two 8×8 matrices and stores the intermediate and final matrix results in an accumulator sized to fit 64 elements corresponding to an 8×8 result matrix.

In the example shown, the input arrays feed matrix computation unit 325. Matrix computation unit 325 is made up of a matrix of computational cells, such as computational cell 327. Each computation cell is a processing element that can receive two operands, one element from each input matrix, and performs a computation, such as a multiplication, on the two input operands. In some embodiments, the computation is a multiplication and addition. For example, the two input elements are multiplied and the result is added to the current result in an accumulator and stored back into the accumulator. In some embodiments, each computational cell, such as computational cell 327, includes an arithmetic logic unit for performing arithmetic logic operations such as a multiply, a divide, an addition, or a subtraction operation. In some embodiments, multiple operations can be performed in the same clock cycle, such as a multiply and add operation needed for performing a partial dot-product. Each computational cell may include an adder, a multiplier, and/or one or more accumulators corresponding to one or more pairs of data and weight input arrays. In some embodiments, each computational cell, such as computational cell 327, includes a floating-point multiplier and one or more accumulators. Although output accumulators 329 and 331 are depicted separate from computational cell 327 in FIG. 3, in some embodiments, corresponding portions of output accumulators 329 and 331 are integrated into their respective computational cells. For example, the accumulators of each computational cell together make up the output accumulators 329 and 331.

In various embodiments, the computational cells of matrix computation unit 325 support floating-point operations such as floating-point multiplications and additions. In various embodiments, each computational cell includes a multiplier and one or more accumulators to perform a multiply and addition operating in a single cycle. Prior to the start of each matrix computation, the designated accumulator may be cleared. During the process of performing a matrix computation, the designated accumulator is used to accumulate and store intermediate results. In some embodiments, matrix processor 313 is an 8×8 matrix processor and matrix computation unit 325 includes 64 computational cells. Each cycle, 128 elements can be loaded into matrix computation unit 325, two input elements as operands for each of the 64 computation cells. Each computation cell also has access to an accumulator value stored in the designated accumulator.

In some embodiments, a matrix multiplication requires multiple clock cycles to complete. For each clock cycle, a single row and single column is retrieved from the input operands. For example, a row is retrieved from the matrix stored in the data input array and a column is retrieved from the matrix stored in the weight input array. In some embodiments, the data is retrieved by shifting the data in an input array by an entire row or column. Each row and column is a vector and each vector is copied across the entire computational unit. Each row is duplicated "down" the rows of matrix computational unit 325 and each column is duplicated "across" the columns of matrix computational unit 325. For an 8×8 matrix processor, each column of the weight input matrix is 8-elements and each row of the data input matrix is 8-elements. For each pass, a single weight column is duplicated for each of the eight columns of matrix computational unit 325 and a single data row is duplicated for each of the eight rows of matrix computational unit 325. By duplicating the data across and down one row and one column at a time, an 8×8 matrix processor can complete a matrix multiplication in 8-cycles. During each cycle, the intermediate result of multiplication and accumulation is stored in a designated accumulator. By the eighth and final cycle, the final matrix result is stored in the designated accumulator. A matrix processor using different dimensions, for example, 4×4 or 16×16 matrices, can be used with corresponding sized input arrays, accumulators, and computational cells.

In some embodiments, the input data elements are 8-bit floating-point values. By utilizing 8-bit values, the bandwidth performance of the matrix processor is significantly improved. By utilizing configurable floating-point values and configurable biases, the precision and accuracy required for machine learning training is retained and bandwidth is increased. Utilizing an 8-bit format, a 64-byte×64-byte matrix processor can compute a matrix multiplication for two 8×8 matrices (totaling 128 elements). In contrast, using a 32-bit format, a 64-byte×64-byte matrix processor can compute a matrix multiplication for two 4×4 matrices (totaling only 32 elements). By optimizing the matrix elements using a configurable 8-bit floating-point format, the bandwidth for loading matrix elements into a matrix processor is improved significantly. Power consumption per area is also drastically improved. To prevent overflow and underflow errors, the intermediate and final results stored in the designated accumulator utilize a larger bit format, such as a 21-bit, 27-bit, or another appropriate floating-point format. Using 8-bit elements as input elements and storing the intermediate results using a 21-bit format preserves the precision and accuracy required for training while also maintaining high input bandwidth to the matrix processor. In various embodiments, each output accumulator stores each element of the result matrix using a 21-bit floating-point number, such as format 500 of FIG. 5. In some embodiments, matrix processor 313 is an 8×8 matrix processor that performs matrix operations using 8-bit floating-point input values and computes the intermediate and final matrix results using 21-bit floating-point values. Input arrays are 64-bytes (64 8-bit elements) and output accumulators are 168 bytes (64 21-bit elements). In various embodiments, the output accumulator is designated by the matrix computation instruction. Similarly, the 8-bit floating-point format and exponent bias can be configured by the matrix computation instruction and/or one or more register arguments.

In some embodiments, multiple different 8-bit floating-point formats are supported by matrix processor 313. For example, different formats 400 and 410 are supported and can be selected based on the computation task. Each format allocates a different number of bits to represent the exponent and mantissa of a floating-point number. Depending on the use case, one or another format is selected. In the event a high precision number is needed, more bit can be allocated to the mantissa and a format, such as format 400 with more mantissa bits than format 410, is selected. A format with more mantissa bits may be selected for performing gradient descent where very small deltas are required to preserve accuracy. As another example, a format with more mantissa bits may be selected for performing forward propagation to compute a cost function. As another optimization, each floating-point format utilizes a configurable bias. A configurable bias is used to shift the exponent range. For example, without an exponent bias, an exponent represented by 3-bits can specify an exponent value between $2^0$ and $2^7$, inclusive. A bias of 5 shifts the range of the exponents to having an exponent value between $2^{-5}$ and $2^{+2}$, inclusive. As another example, using 4-bits to represent an exponent and a bias of 15 shifts the range of the exponent from $2^0$ and $2^{31}$, inclusive, to between $2^{-15}$ and $2^{+16}$, inclusive. In various embodiments, by optimizing the number of bits for the exponent field and the number of bits for the bias, the range expressed using the exponent and the numeric coverage of the float-point number can be optimized to preserve accuracy and precision for the expected input and results.

In some embodiments, the floating-point format supports denormal numbers. For example, an exponent field having a value of zero does not require a normalized mantissa with no leading zeros. By supporting denormal numbers, the exponent range and the number of values that can be represented is increased. In various embodiments, each computational cell, such as computational cell 327, includes support for performing floating-point operations using one or more denormal operands.

In some embodiments, the value of the configurable bias is limited by the number of bits used to represent the configurable bias. For example, a 3-bit configurable bias can have eight different values (0 through 7, inclusive). In some embodiments, as an optimization, the values represented by the configurable bias are not consecutive. For example, the eight values represented by a 3-bit configurable bias are not limited to the values 0 through 7. Instead, the biases are selectable from 8 different values. For example, a configurable bias can be selected from eight pre-determined values: 1, 3, 5, 7, 9, 11, 15, and 17. In some embodiments, the pre-determined values are determined based on the most useful biases. The pre-determined values may be selected at least in part to maximize the range and minimize the overlap between the ranges for different biases. In some embodiments, the configurable bias is specified by the matrix processor instruction and/or stored in a register (not shown). In some embodiments, the configurable bias is reconfigurable. For example, after performing an arithmetic operation, the configurable bias can be reconfigured to adjust to the new range of the result. In some embodiments, the reconfiguration is specified as part of the computational instruction. For example, the instruction may specify a new bias that is used to reconfigure the configurable bias.

In some embodiments, the computational cells of the matrix computational unit can be grouped to also support matrix operations for a larger input number format. For example, the computational cells of an 8×8 matrix computational unit that each operate on 8-bit floating-point matrix elements as input can be grouped to perform 4×4 matrix operations using 16-bit floating-point matrix elements as input. In some embodiments, the output accumulators are sized to prevent the loss of accuracy in the quantized result. For example, a 16-bit floating-point format using a single bit for a sign bit, 8-bits for the exponent, 7-bits for the mantissa, and a non-configurable exponent bias utilizes a 27-bit intermediate floating-point format for floating-point results. A 27-bit floating-point format may allocate a single bit for a sign bit, 9-bits for the exponent, and 17-bits for the mantissa. Support for the grouped operation mode makes the matrix computational unit more versatile in part by supporting more operand formats.

In various embodiments, the grouped operation mode performs matrix operations by splitting an input operand into multiple components and providing each split component to a different computational cell of the group. Each split component is represented as a floating-point number and when added together, the different split components total the original operand. For example, an input operand is split into the most significant bits (i.e., a high component) and the least significant bits (i.e., a low component) of the operand. In various embodiments, the exponent of the high component uses the same exponent value of the input operand whereas the exponent of the low component is adjusted to account for subtracting the most significant bits from the input operand. In some embodiments, the component for the least significant bits is normalized. In some embodiments, a computational cell supports denormal numbers and the component can be represented as a denormal number.

In various embodiments, when performing a multiplication on two input operands using an operand number format twice the size of the computational cell format (e.g., 16-bit floating point operands instead of 8-bit floating point operands), four computational cells are grouped together and each input operand has a corresponding high and low component. The high and low components of each input operand are provided to processing elements by pairing high-high, high-low, low-high, and low-low components and providing the different pairs to different computational cells of the group. At each computational cell of the group, a matrix multiplication is performed and the result stored in an output accumulator associated with the computational cell. In some embodiments, the output accumulator utilizes a floating-point format with a higher number of bits than the original input operand. For example, the output accumulator may utilized 27-bits for 16-bit input operands that do not have a configurable exponent bias. When the output results of the grouped cells are added together, the result is the matrix multiplication of the original input operands. In some embodiments, the results are moved out of the matrix computational unit and added together using a post-processing unit such as a vector computational unit. For example, a floating-point add instruction is used to add the component results to determine a multiplication result. A floating-point vector add instruction can be used to add the components for a vector of results. In various embodiments, the matrix computation unit is matrix computation unit 325 of FIG. 3 and the post-processing unit is post-processing unit 317 of FIG. 3.

In some embodiments, node engine 300 includes multiple matrix processors 313 and 351-357. The functionality and components of matrix processors 351-357 are described with respect to matrix processor 313. In some embodiments, each matrix processor requires at least a minimum number of cycles to complete a matrix multiplication, for example, eight cycles for an 8×8 matrix processor. By incorporating multiple matrix processors in a single node engine, matrix multiplications can be distributed to different matrix processors. The resulting output can be staggered to read a matrix result from a different matrix processor each cycle. For a set of eight 8×8 matrix processors, each matrix processor can output a matrix result every eight cycles. Staggering the processors allows a matrix result every clock cycle from a different processor. In some embodiments, a different sized matrix processor, for example, a 4×4 or a 16×16 processor, can be used. Similarly a different number of matrix processors can be included in the node engine based on the depth of the matrix processor computation pipeline.

In some embodiments, a matrix instruction specifies a particular matrix operation, a particular matrix processor, designates an accumulator for storing the matrix result, and specifies the location of the matrix operands. The location of the matrix operands may be specified using a register value or a memory address. For example, a matrix instruction may specify a matrix multiplication, matrix multiplication processor 313, output accumulator 329, a register of post-processing unit register file 307, and a memory address of memory 303. In some embodiments, control unit 301 issues matrix instructions. In some embodiments, operations include matrix multiplication, matrix addition, dot-product, matrix inverse, etc. In some configurations, the output accumulators of each matrix processor uniquely identify a matrix processor. By specifying a particular output accumulator as part of the matrix instruction, the matrix processor is inherently selected. For example, using an A0-A11 naming scheme for accumulators, the first and second output accumulators (e.g., A0 and A1) are mapped to matrix processor 313, the third and fourth output accumulators (e.g., A2 and A3) are mapped to matrix processor 351, the fifth and sixth output accumulators (e.g., A4 and A5) are mapped to matrix processor 352, and so forth. In the example, accumulators 329 and 331 are referenced as A0 and A1, respectively. A matrix multiply instruction specifying accumulator A1 is issued to matrix processor 313 since only matrix processor 313 can store results to accumulator A1.

In some embodiments, output array 315 is used to retrieve the results of one or more matrix processors. In some embodiments, output array 315 includes a multiplexer to determine from which matrix processor to load a result into the output array. In some embodiments, the output array is a 64-byte array and requires two move instructions to move a matrix result from a matrix processor into the output array. For example, a matrix result using 21-bit floating-point values requires 168 bytes. Each 21-bit floating-point value is converted during a move command to a 16-bit floating-point value. Using only two move instructions, a result matrix of 64 elements is converted from 64 21-bit to 64 16-bit floating-point values. For example, a move high instruction moves the highest 32-elements into the output array and a move low instruction moves the remaining lowest 32-elements into the output array. In various embodiments, the output array is 64-bytes so the result of the first move is first stored in a register (such as a register of post-processing unit register file 307) before the second move is performed. In various embodiments, the output array is a temporary output array until the values are moved to the memory or register. In some embodiments, the move instructions are non-destructive and do not clear the matrix result from the matrix processor, for example, by clearing the source accumulator.

In some embodiments, post-processing unit 317 is used to perform post-processing such as normalization, scaling, activation functions, pooling, etc. In some embodiments, post-processing unit 317 is a vector computational engine that operates on each element of a vector. The post-processing unit may utilize different number formats such as 1-byte, 2-byte, and 4-byte number formats including float-point number formats. In some embodiments, the number of lanes of the post-processing unit 317 can be configured. For example, a post-processing unit 317 that takes a 64-byte vector can operate on 64 1-byte elements, 32 2-byte elements, or 16 4-byte elements corresponding to 64, 32, and 16 lane configurations. In the example shown, post-processing unit 317 utilizes post-processing unit register file 307 for retrieving data for input and for storing post-processing results. In some embodiments, additional post-processing units (not shown) may be included in the node engine as necessary to perform additional machine learning functionality.

Figure 4:
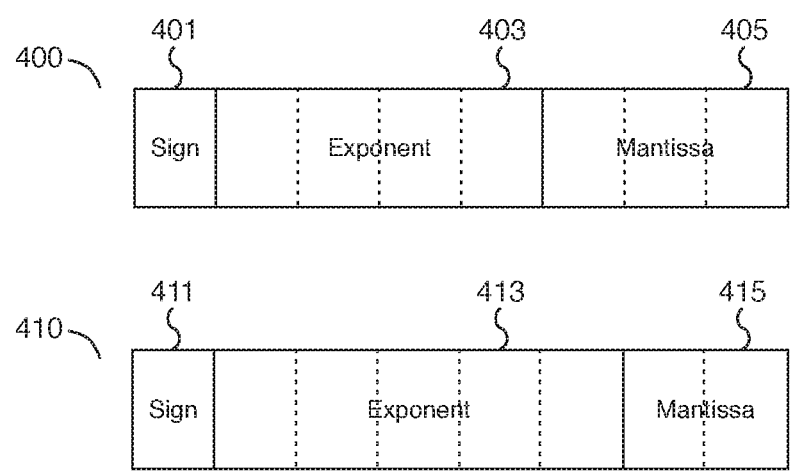
FIG. 4 is a block diagram illustrating embodiments of an 8-bit floating-point format.

FIG. 4 is a block diagram illustrating embodiments of an 8-bit floating-point format. In the example shown, 8-bit floating-point formats 400 and 410 are different 8-bit floating-point formats for representing a floating-point number using a sign, mantissa, and exponent. In some embodiments, a node engine such as node engine 300 and a matrix processor such as matrix processor 313 of FIG. 3 utilize 8-bit floating-point formats 400 and 410 for matrix operations. By performing matrix operations using 8-bit floating-point formats, such as formats 400 and 410, instead of a 16-bit, 32-bit, or another floating-point format, the bandwidth of the matrix processor is significantly increased. In some embodiments, the formats 400 and 410 support a configurable bias. The configurable bias allows for a greater range in representing the exponent for improved accuracy while still maintaining the 8-bit data size. In some embodiments, the floating-point formats 400 and 410 supports denormal numbers to increase the number of values that can be represented.

In the example shown, 8-bit floating-point format 400 includes a single bit for sign bit 401, 4-bits for exponent 403, and 3-bits for mantissa 405. Sign bit 401, exponent 403, and mantissa 405 take up a total of 8-bits and can be used to represent a floating-point number. Similarly, 8-bit floating-point format 410 includes a single bit for sign bit 411, 5-bits for exponent 413, and 2-bits for mantissa 415. Sign bit 411, exponent 413, and mantissa 415 take up a total of 8-bits and can be used to represent a floating-point number. In some embodiments, a configurable bias is used to bias the exponent. For example, the 4-bit exponent 403 of format 400 allows exponent 403 to have 16 different values (i.e., values 0 through 15, inclusive). Using 4-bits with no bias (or the equivalent of a configurable bias set to zero), exponent 403 can represent an exponent with values $2^0$ through $2^{15}$, corresponding to an exponent field with values 0 and 15, respectively. By using a configurable bias, the range of the exponent can be shifted. For example, using a configurable bias set to a value of 5, exponent 403 can represent an exponent with values $2^{-5}$ through $2^{10}$. In various embodiments, the value of the configurable bias is limited by the number of bits used to represent the configurable bias. For example, a 3-bit configurable bias can have eight different values. In some embodiments, the values represented by the configurable bias are not consecutive. For example, the eight values represented by a 3-bit configurable bias are not limited to the values 0 through 7. Instead, the biases are selectable from 8 different values. For example, a configurable bias can be selected from eight pre-determined values: 1, 3, 5, 7, 9, 11, 15, and 17. In some embodiments, the pre-determined values are determined based on the most useful biases. In some embodiments, the pre-determined values are selected at least in part to maximize the range of the exponent and to minimize the overlap between the ranges for different biases. In some embodiments, the configurable bias is specified by the matrix processor instruction and/or stored in a register (not shown).

In various embodiments, multiple different 8-bit floating-point formats, such as formats 400 and 410, are supported by a matrix processor. By supporting multiple formats, the precision can be utilized in either the exponent or the mantissa. For example, certain operations such as gradient descent may require additional precision and thus a greater number of bits for the mantissa. As another example, more bits can be used for the mantissa for operations where the values are clustered close together and do not need additional range for exponents. In contrast, for certain operations, the range of values may be greater and a larger range for the exponent is needed. Using format 410, fewer bits are dedicated for the mantissa and more are dedicated for the exponent. In some embodiments, the format is specified by the matrix processor instruction and may be stored in a register (not shown). In various embodiments, additional floating-point formats not depicted may be supported. For example, a 4-bit mantissa and 3-bit exponent format may be supported (not shown).

Figure 5:
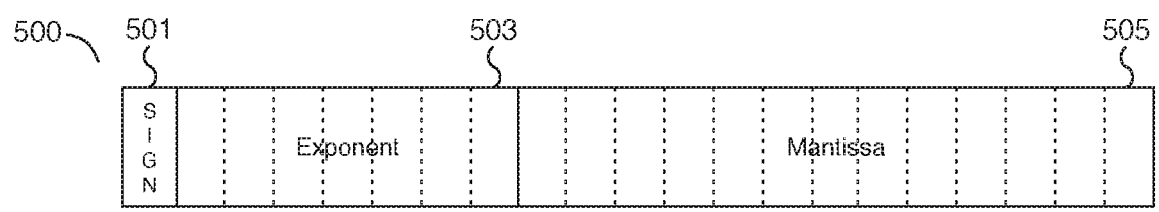
FIG. 5 is a block diagram illustrating an embodiment of a 21-bit floating-point format.

FIG. 5 is a block diagram illustrating an embodiment of a 21-bit floating-point format. In the example shown, floating-point format 500 is a 21-bit floating-point format for representing a floating-point number using a sign, mantissa, and exponent. In some embodiments, a node engine such as node engine 300 and a matrix processor such as matrix processor 313 of FIG. 3 utilize a 21-bit floating-point format, such as format 500, for certain matrix operations, such as for storing the results (and intermediate results) of matrix multiplications and/or matrix additions. In some embodiments, format 500 is used by accumulators for a matrix processor, such as output accumulators 329 and 331 of FIG. 3. For example, the multiplication result of two 8-bit multiplication operands may cause an overflow or underflow error if the result is limited to the same 8-bit format. Using a format larger than 8-bits for the result prevents overflow and underflow errors. Similarly, using a 21-bit floating-point format to store intermediate and final results when computing matrix multiplication with 8-bit matrix elements prevents overflow or underflow errors. Using a result with a bit-depth smaller than 32-bits increases the efficiency of memory usage. In various embodiments, format 500 with a bit-depth of 21-bits is used to optimize for both memory usage and accuracy. In some embodiments, the format 500 supports a configurable bias. The configurable bias allows for a greater range for improved accuracy while still maintaining the 21-bit data size. In some embodiments, the configurable bias is specified by the matrix processor instruction and/or stored in a register (not shown).

In the example shown, 21-bit floating-point format 500 includes a single bit for sign bit 501, 7-bits for exponent 503, and 13-bits for mantissa 505. Sign bit 501, exponent 503, and mantissa 505 take up a total of 21-bits and can be used to represent a floating-point number. In some embodiments, a configurable bias is used to bias the exponent. For example, the 7-bit exponent 503 of format 500 allows exponent 503 to have 128 different values (i.e., values 0 through 127, inclusive). Using 7-bits with no bias (or the equivalent of a configurable bias set to zero), exponent 503 can represent an exponent with values $2^0$ through $2^{127}$, corresponding to an exponent field with values 0 and 127, respectively.

In various embodiments, format 500 is used by one or more accumulators, such as output accumulators 329 and 331 of FIG. 3, of a matrix processor for a node engine, such as node engine 300 and matrix processor 313 of FIG. 3. In some embodiments, a register (not shown) is used to store a setting for the configurable bias used for storing a floating-point number in a particular accumulator. In some embodiments, multiple 21-bit formats (e.g., with different allocations of bits for exponent and mantissa fields) may be used and the particular format is specified by the matrix processor instruction. The value for the configurable bias may be specified using the matrix processor instruction and/or stored in a register.

Although FIG. 5 depicts a 21-bit floating-point format that can be used by accumulators for a matrix processor, such as output accumulators 329 and 331 of FIG. 3, formats with alternative bit-depths may be used. For example, depending on the operating requirements, such as requirements for preventing loss of accuracy, a 27-bit floating-point format may be used to prevent the loss of accuracy in quantized results when supporting operations on certain 16-bit floating point operations. As one example, a 27-bit floating-point format may include a single bit for a sign bit, 9-bits for the exponent, and 17-bits for the mantissa. A 27-bit floating-point format may be used to accumulate multiplication operations on 16-bit floating-point operands. In some embodiments, a 16-bit floating-point operand is represented with a single bit for a sign bit, 8-bits for the exponent, and 7-bits for the mantissa.

Figure 6:
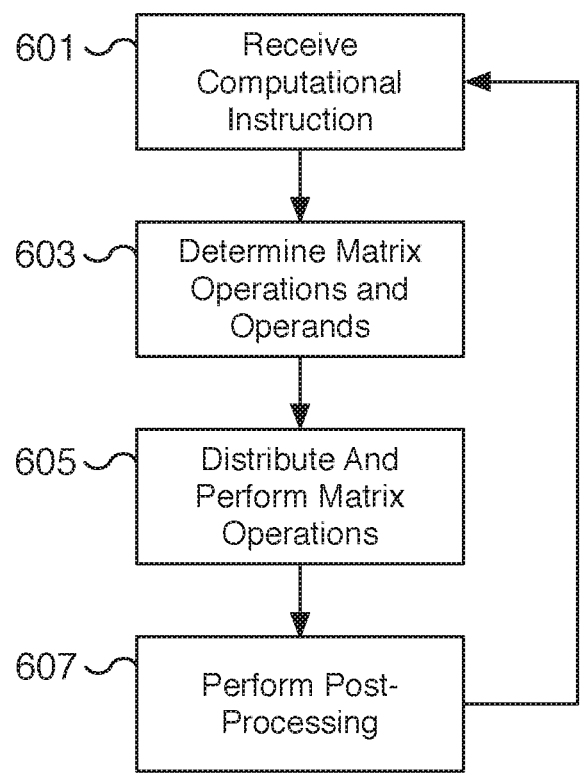
FIG. 6 is a flow diagram illustrating an embodiment of a process for performing matrix computations.

FIG. 6 is a flow diagram illustrating an embodiment of a process for performing matrix computations. The process of FIG. 6 is used by a training platform such as training platform 223 of FIG. 2 to perform matrix computations by one or more node engines, such as node engines 225 of FIG. 2 or node engine 300 of FIG. 3. In some embodiments, a training platform receives one or more matrix computation operations and parallelizes the operations across different node engines. Each node engine may then also parallelize its operations across different matrix processors. The results may be combined, as appropriate, at one or more node engines to determine a result, such as a matrix of weights for a machine learning model. In some embodiments, the process of FIG. 6 is performed as part of step 105 of FIG. 1.

At 601, a computational instruction is received. In some embodiments, the computational instruction is received by a training platform such as training platform 223 of FIG. 2. The training platform processes the computational instruction and performs the necessary division and distribution of work to different node engines. For example, a computational instruction requesting a convolution of an image with a filter is received at a server of the training platform initiating a machine learning training process. In some embodiments, the instruction may include the necessary parameters to perform the computational instruction including the operations involved and the operands. For example, the instruction may include the size of the input operands (e.g., the size of each input matrix), the start address of each input matrix, a stride parameter, a padding parameter, and/or matrix, vector, and/or post-processing commands. For example, a computational instruction may describe an image data size (e.g., 96×96, 1920×1080, etc.) and bit depth (e.g., 8-bits, 16-bits, etc.) and a filter size and bit depth, etc. In many scenarios, the matrices of a matrix computation may be larger than can fit inside a matrix processor so additional processing may be performed to subdivide the computation so that it can be performed by different node engines or matrix processors.

At 603, matrix operations and operands are determined. In the event one or more matrices of the computation instruction received at 601 are larger than the input matrices for a matrix processor, the computational instruction of 601 is divided into small component operations. At 603, matrix operations and operands corresponding to smaller component operations are determined and may include slicing, segmenting, or partitioning the original matrix operands into smaller matrices and performing matrix operations on the smaller matrices. The results of the matrix operations on the smaller matrices may be combined to complete the computation instruction received at 601. Different node engines and matrix processors may be assigned to perform different components of the computational instruction. In some embodiments, the elements of the matrix operands may be converted or targeted for conversion to an 8-bit floating-point format. An 8-bit floating-point format, such as format 400 or format 410 of FIG. 4, is used by a node engine to increase the processing and performance bandwidth as well as the power efficiency of the matrix processor. In some embodiments, a configurable bias for a corresponding floating-point format is or will be selected. For example, a format with a high-precision mantissa is selected for performing gradient descent operations.

In various embodiments, a larger matrix is sliced into a smaller two-dimensional matrix with a size limited to the appropriate dimensions of a matrix processor. In some embodiments, the sliced matrix is a smaller matrix with addresses to elements referencing the original matrix. The sliced matrix may be serialized into a vector for processing. In some embodiments, different slices of the matrix may overlap with previous slices. In various embodiments, matrices may be sliced only at boundaries corresponding to multiples of the read buffer size. For example, in the event each read buffer is 8-bytes in size, each row of a sliced matrix must begin with an address having a multiple of eight. In the event a matrix fits within the computational array, no slicing is required (i.e., the matrix slice used is simply the original matrix).

At 605, matrix operations are distributed and performed. For example, the matrix operations corresponding to the matrix operations and operands determined at 603 are distributed to one or more node engines and to one or more matrix processors of the node engines. In various embodiments, the matrix operations are performed by one or more matrix processors using 8-bit element matrices. The values for the elements of the matrix results are accumulated into 21-bit, 27-bit, or another appropriate floating-point format. In various embodiments, the matrix results can be moved out of the matrix processor in one of several formats including 8-bit, 16-bit, and 32-bit floating-point formats. In various embodiments, each node engine can perform multiple matrix operations in parallel by utilizing multiple matrix processors.

In some embodiments, references to the matrix operands are distributed along with the operations to a node engine. In this manner, the node engine can perform a data read to load the corresponding elements of the sliced matrices. In some embodiments, the node engine will linearize a sliced matrix for loading into memory and/or a register where the input matrix can then be sent to a matrix processor. In some embodiments, a control unit of the node engine coordinates the scheduling, issuing, and synchronization of operations including the loading of sliced matrix operands (including addressing specified strides, paddings, and other parameters of the matrix operands) and the operation of the matrix processors. Once a matrix operation is issued to a matrix processor, the matrix processor will take a certain number of clock cycles to complete the matrix operation. In some embodiments, the matrix processor performs matrix operations using the processes of FIGS. 7 and/or 8.

At 607, post-processing is performed. In some embodiments, post-processing may be performed by node engines and may include additional vector operations performed after the completion of a matrix operation. Post-processing operations can be performed by a post-processing unit, such as a vector processor or vector computational unit, of the node engine. In some embodiments, vector post-processing includes performing complex operations such as arithmetic operations, scaling, normalization, and/or the application of an activation function such as a rectified linear unit (ReLU) function on each element of a vector. In some embodiments, the elements of the vector may be converted/formatted to 8-bit, 16-bit, or 32-bit elements depending on the precision needed. In various embodiments, the results of the distributed matrix operations by each node engine may be sent back to or redirected by the training platform server and used for further processing. For example, the results of matrix operations distributed and performed at 605 may be combined and utilized as operands for additional vector or matrix operations. After post-processing is initiated at 607, processing loops back to 601 to receive additional computational instructions. In some embodiments, post-processing does not need to complete before processing loops back to 601 for additional computational instructions.

Figure 7:
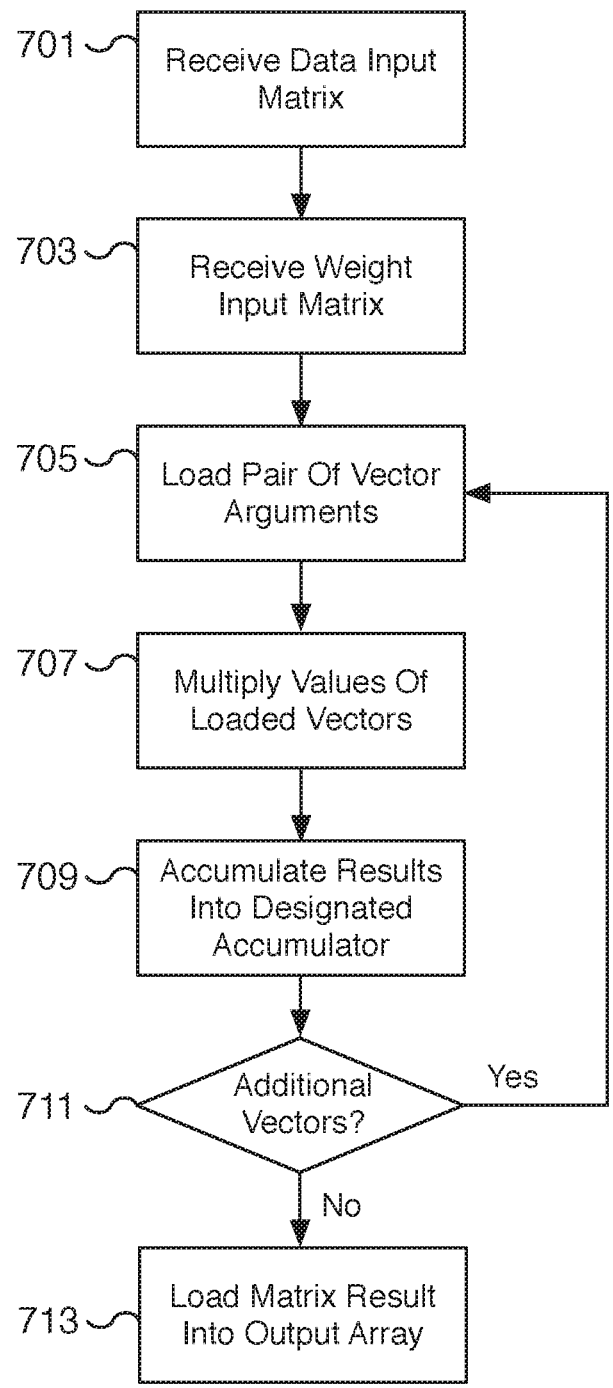
FIG. 7 is a flow diagram illustrating an embodiment of a process for performing matrix computations.

FIG. 7 is a flow diagram illustrating an embodiment of a process for performing matrix computations. The process of FIG. 7 is used by a matrix processor such as matrix processors 313 and 351-357 of node engine 300 of FIG. 3 to perform matrix computations. In some embodiments, each matrix processor of a node engine can perform the process of FIG. 7 in parallel. For example, matrix processors 313 and 351-357 each perform the process of FIG. 7 in parallel on different matrix arguments, although each may be at a different step for processing to stagger the completion of their respective operations. In some embodiments, the process is utilized to perform a convolution using a data matrix and a weight matrix. In some scenarios, the input matrices are slices of larger matrices. In various embodiments, the process of FIG. 7 may be initiated by a matrix computation instruction via a control unit. The instruction may specify the two matrix operands (e.g., the memory or register locations of a data and a weight matrix), a configurable bias, a floating-point format, and a designated accumulator to store the matrix computation result. In some embodiments, the designated accumulator is zeroed out before the matrix computation begins. In some embodiments, the designated accumulator is output accumulator 329 or 331 of FIG. 3. In some embodiments, the process of FIG. 7 is performed at 605 of FIG. 6.

At 701, a data input matrix is received. For example, elements of a data input matrix corresponding to training sensor data are linearized and stored in a data input array of a matrix processor. In some embodiments, a data input matrix is stored in a data input array, such as data input array 321 of matrix processor 313 FIG. 3. Each data input array is capable of storing an entire linearized matrix for the corresponding matrix processor to be processed by the matrix computational unit. Thus a matrix processor capable of multiplying two 8×8 matrices uses a data input array capable of storing all 64 elements of an input 8×8 data matrix. For example, in some embodiments, each data input array is 64 bytes and stores each element as an 8-bit floating-point number. The format for the floating-point number may use format 400 or 410 of FIG. 4 and include a configurable bias. The configurable bias may be specified by a matrix instruction and/or by a register. The received data input matrix may be received from a register or from memory, such as SRAM. In some embodiments, one or more reads are issued to load the entire data input matrix to the matrix processor but the entire matrix is not available at once. For example, for a sliced matrix, data for some rows (or columns) may require additional delay before the data is available. Thus the data for the data input array might arrive piecemeal. In some embodiments, a single read is sufficient to load the entire data input matrix. In some embodiments, the data input matrix is a gradient input matrix.

At 703, a weight input matrix is received. For example, elements of a weight input matrix corresponding to machine learning weights of a filter are linearized and stored in a weight input array of a matrix processor. In some embodiments, a weight input matrix is stored in a weight input array, such as weight input array 323 of matrix processor 313 FIG. 3. Each weight input array is capable of storing an entire linearized matrix for the corresponding matrix processor to be processed by the matrix computational unit. Thus a matrix processor capable of multiplying two 8×8 matrices uses a weight input array capable of storing all 64 elements of an input 8×8 weight matrix. For example, in some embodiments, each weight input array is 64 bytes and stores each element as an 8-bit floating-point number. The format for the floating-point number may use format 400 or 410 of FIG. 4 and include a configurable bias. The configurable bias may be specified by a matrix instruction and/or by a register. The received weight input matrix may be received from a register or from memory, such as SRAM. In some embodiments, one or more reads are issued to load the entire weight input matrix to the matrix processor but the entire matrix is not available at once. For example, for a sliced matrix, weight data for some rows (or columns) may require additional delay before the weight data is available. Thus the weight data for the weight input array might arrive piecemeal. In some embodiments, a single read is sufficient to load the entire weight input matrix. In some embodiments, the weight input matrix is a gradient input matrix.

At 705, a pair of vector arguments is loaded into the matrix computational unit. From each input matrix, a vector corresponding to a row and a vector corresponding to a column are loaded as input arguments into the matrix computational unit such as matrix computational unit 325 of FIG. 3. As part of the loading process, the column vector is duplicated across the entire matrix computation unit and the row vector is duplicated down the entire matrix computation unit. For example, an entire vector corresponding to a column of the weight input matrix is loaded into the computational unit. Each element of the column vector is duplicated across an entire row. Thus each column of an 8×8 matrix computational unit receives the same 8-element column vector and the value loaded to each cell of a row of the matrix computation unit is the same. Similarly, an entire vector corresponding to a row of the data input matrix is loaded into the computational unit and each element of the row vector is duplicated down an entire column. Thus each row of an 8×8 matrix computational unit receives the same 8-element column vector and the value loaded to each cell of a column of the matrix computation unit is the same. For an 8×8 matrix computational unit, one eighth of the input matrix elements is loaded. At 705, an unloaded pair of vectors from each input matrix is loaded into the matrix computational unit. Each subsequent loop through step 705 loads the next available column and row from the input weight and data matrices. Thus, an 8×8 matrix requires at least 8 cycles to complete loading whereas a 4×4 matrix requires at least 4 cycles to complete loading.

At 707, values of the loaded vectors are multiplied. For each computational cell (such as computational cell 327 of FIG. 3) of the matrix computational unit, a matrix multiplication is performed using the element loaded at the corresponding computational cell. In various embodiments, the multiplication is performed on two 8-bit floating-point values and stored as a higher-bit floating-point value to prevent overflow and to maintain precision. In some embodiments, the higher-bit floating-point format is the 21-bit floating-point format of FIG. 5. In some embodiments, the higher-bit floating-point format is a 27-bit floating-point format to further reduce the loss of accuracy in the quantized result. For an 8×8 matrix computational unit, each of the 64 computational cells performs a matrix multiplication.

At 709, multiplication results are accumulated into a designated accumulator. For example, the multiplication results of each computational unit at 707 are each accumulated into one of the accumulators of the matrix processor. In some embodiments, a matrix processor includes more than one accumulator, such as the two output accumulators 329 and 331 of FIG. 3. This is beneficial so that the matrix processor can interleave the operation of different matrix operations. In some embodiments, each computational cell includes an accumulator that adds the current value of the element in the accumulator corresponding to that computational cell to the result of the cell's matrix multiplication. In various embodiments, the accumulator is sized to store an accumulation result for each element of the matrix. Thus each accumulator of an 8×8 matrix computational unit has at least 64 elements. In some embodiments, similar to the result of multiplication at 707, the elements of the accumulator use a higher-bit floating-point value than the input to the matrix processor to prevent overflow and to maintain precision. In some embodiments, the higher-bit floating-point format is the 21-bit floating-point format of FIG. 5 or another higher-bit floating-point format. In some embodiments, an accumulator for an 8×8 matrix computational unit is 168-bytes to allow for 64 elements, each storing a 21-bit floating point number.

At 711, a determination is made whether there are additional vectors remaining for the matrix operation. For example, in order to multiply two matrices, at most one column from the weight input matrix and one row from the data input matrix are loaded for each clock cycle. To complete the entire matrix multiplication, every column and every row must be loaded. An 8×8 matrix requires at least 8 cycles to completely load both input matrices into the matrix computational unit. Similarly, a 4×4 matrix requires at least 4 cycles to completely load both input matrices into the matrix computational unit. In the event there are additional vectors remaining to be loaded, processing continues back to 705. In the event no additional vectors remain to be loaded (both entire input matrices have been loaded), the matrix multiplication is complete and processing continues to 713.

At 713, a matrix result is loaded into an output array from the designated accumulator. Since the matrix computation is complete, the matrix result is stored in the designated accumulator. In some embodiments, the elements of the matrix are stored in the designated accumulator as 21-bit floating-point values. Thus for an 8×8 matrix, the accumulator stores 64 values and is 168 bytes in size. In some embodiments, multiple move operations are needed to move the result from the accumulator to an output array, such as output array 315 of FIG. 3. In some embodiments, the output array and bus to the output array are 64-bytes wide. The accumulator results are converted from 21-bit floating-point values into 16-bit floating-point values that can be stored in two 64-byte components. Using the 8×8 result matrix as an example, two move operations are needed to move the results from the accumulator of the matrix processor. For example, a move high operation is used to move the high bits of the accumulator (corresponding to 32 elements of the matrix) into a 64-bit output array as 16-bit floating-point values. Once moved in the output array, the 32 elements can be stored in a register, such as one of the registers of the post-processing unit register file 307 of FIG. 3 or moved to memory. Subsequently a move low operation is used to move the low bits of the accumulator (corresponding to the remaining 32 elements of the matrix) into the 64-bit output array as 16-bit floating-point values. Once in the output array, the remaining 32 elements can also be stored in a register. In various embodiments, two or more operations are needed to move the matrix results out of the matrix processor. By converting the 21-bit floating-point values to 16-bit floating-point values, only two move operations are needed. In some embodiments, the values can be moved out as 8-bit, 16-bit, or 32-bit floating-point values. In the example described, the values are moved out as 16-bit values for later processing by a post-processing unit such as a post-processing unit 317 of FIG. 3. In some embodiments, the post-processing unit is a vector computational engine. In various embodiments, the output array is connected to accumulators of each matrix processor of the node engine and acts as a multiplexer to receive the results of moves (e.g., high and low move instructions) from the different matrix processors.

Figure 8:
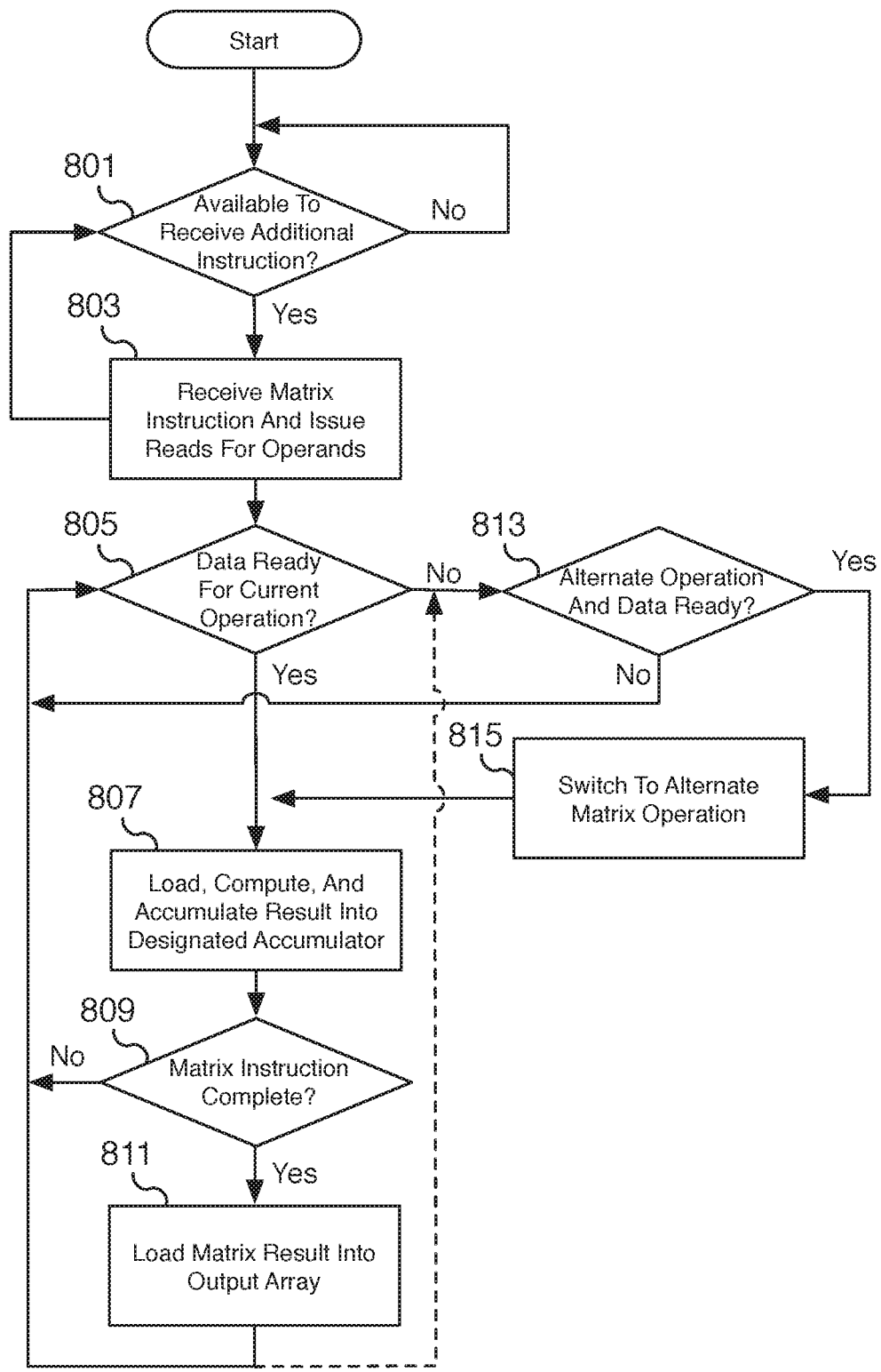
FIG. 8 is a flow diagram illustrating an embodiment of a process for performing multiple interleaved matrix computations.

FIG. 8 is a flow diagram illustrating an embodiment of a process for performing multiple interleaved matrix computations. The process of FIG. 8 is used by a matrix processor such as matrix processors 313 and 351-357 of node engine 300 of FIG. 3 to interleave multiple matrix computations such as two matrix multiplication operations. Each of the interleaved matrix computations may be implemented using multiple intermediate matrix multiplications with the results of the intermediate multiplications being used to compute the larger matrix computation. To improve the processing bandwidth and efficiency, the result of each intermediate matrix multiplication is stored in the matrix processor and not cleared when interleaving an alternate matrix operation. The different matrix operations can be distinct and each have non-overlapping matrix operands.

In some embodiments, each matrix processor of a node engine can process more than one matrix operation at a time, one matrix operation corresponding to each output accumulator of a matrix processor. In some embodiments, the ability to interleave multiple matrix operations allows matrix multiplication operations on very large matrices to be performed. The larger matrices are sliced into smaller matrices that fit the input array of the matrix processor and the results of matrix multiplications of smaller matrices are combined. In various embodiments, the ability to interleave multiple matrix operations increases the bandwidth and performance of the matrix processor by utilizing the matrix computational unit, for example, while waiting for memory reads to complete. Thus, when input operands for a pending matrix operation of a first set of related matrix operations are not available (e.g., due to the latency of a memory read) but the input operands for a pending matrix operation of a second set of related matrix operations are available, the second set of related matrix operations can utilize the matrix computational unit. By utilizing multiple accumulators, the matrix computational unit can switch between multiple matrix computations by storing intermediate results in accumulators dedicated to particular sets of related matrix operations. In some embodiments, the data input array is data input array 321 of FIG. 3, the weight input array is weight input array 323 of FIG. 3, and the multiple accumulators are output accumulators 329 and 331 of FIG. 3. Although two accumulators are shown with respect to matrix processor 313 of FIG. 3, additional accumulators may be included to allow additional matrix operations to be interleaved.

The process of FIG. 8 is a specialized variation of the process of FIG. 7 that utilizes multiple weight input array operands, multiple data input array operands, and multiple output accumulators to support interleaving two matrix multiplication operations. As described with respect to FIG. 7, the process of FIG. 8 similarly implements the steps of FIG. 7 including the loading of a column vector across the matrix computation unit, the loading of a row vector down the matrix computation unit, the multiplication of operands by computational cells, and the accumulation of the multiplication results in a designated accumulator but takes care to not intermingle or wipe the intermediate results of the two interleaved matrix operations. In some embodiments, the process of FIG. 8 is performed at 605 of FIG. 6.

At 801, a determination is made whether the matrix processor can receive an additional matrix operation instruction. In the example of FIG. 8, the matrix processor is capable of interleaving two matrix operations. A determination is made whether there are currently two matrix operations in the process of being performed. In the event the matrix processor can receive an additional matrix operation instruction, processing continues to 803. For example, the matrix processor can receive an additional matrix operation instruction since it is in the middle of processing only a single matrix operation or is idle and not processing any matrix operations. In the event the matrix processor cannot receive an additional matrix operation instruction, processing loops back to 801 until the matrix processor is available to receive a new matrix operation instruction. For example, the matrix processor is currently in the middle of processing two matrix operations and cannot receive another operation until at least one of the current operations completes. In some embodiments, a ready signal is issued to a control unit to signal that the matrix processor is ready to receive additional instructions.

At 803, the matrix processor receives a matrix instruction and issues read requests for the associated matrix operations. For example, a matrix processor receives a matrix multiply instruction with two operands corresponding to two input matrices. Reads are issued for the values of the matrix operands. The values may be read from a register and/or memory. For example, the matrix arguments may specify a register and/or an address in memory. In some embodiments, a memory read may stall the matrix computation since a memory read may take multiple clock cycles for the data to be available. In some embodiments, multiple memory reads may be issued since the matrix is not stored sequentially in memory. This may be a result of a larger matrix being sliced into a smaller matrix operand.

In some embodiments, the instruction received specifies a particular accumulator to store the matrix result. In order to interleave multiple matrix operations, each operation utilizes its own accumulator. The designated accumulator is used to store the intermediate and final matrix results. In some embodiments, the designated accumulator stores intermediate results using a higher-bit floating-point format than the format used for input operands. The higher-bit format minimizes the loss of accuracy when results are quantized.

In various embodiments, when the data corresponding to the matrix operands is available, the values are received and prepared for the matrix processor. In some embodiments, the matrix operands are too large for the matrix processor and multiple intermediate matrix operations are performed to complete the matrix instruction. In the event data is not available, the matrix computational unit may stall and be idle. Instead of remaining idle, a second matrix operation may be performed as long as data for the second operation is available.

At 803, processing continues to both 801 and 805. The processing loops back to 801 to fetch new instructions while also simultaneously continuing to 805 to execute the instruction received at 803. In various embodiments, the fetching of new instructions happens in parallel with the processing of the current matrix operations. In some embodiments, the two processing branches to 801 and 805 are implemented using a pipelined-based approach.

At 805, a determination is made whether data is ready for the current matrix operation. For example, the elements to be loaded from the matrix operands of the current matrix operation must be available to be loaded to the computational cells of the matrix computational unit. In some embodiments, the data loaded into the matrix computational unit are slices of the matrix operands that are sized for the input arrays of the matrix computational unit. For the weight input array, the pending columns of elements must be ready. For the data input array, the pending rows of elements must be ready. In the event the elements of weight column and data rows for the current matrix operation are available, processing continues to 807. In the event the pending elements for the current matrix operation are not available, processing continues to 813. For example, the pending elements may not be available due to the latency from a memory read and/or a cache miss. Instead of stalling while waiting for the data to become available, the matrix computation unit may potentially be utilized for an alternative matrix operation.

At 807, the values from the weight columns and data rows for the current matrix operation are loaded to corresponding computational cells, compute operations are performed on the values, and the compute result is accumulated into the designated accumulator. In some embodiments, the compute operations are multiply operations corresponding to multiplying elements from two different matrices. In some embodiments, the process at 807 is described with respect to steps 701, 703, 705, 707, 709, and/or 711 of FIG. 7. For example, the values are loaded as 8-bit floating-point values with a configurable bias. The result of the computation, such as a multiplication, and the accumulation is stored as a 21-bit floating-point format in the first accumulator. In some scenarios, additional configuration related to the matrix operation is performed at 807 such as clearing the accumulator, determining a floating-point format, and/or determining a configurable bias for a floating-point format, among others.

At 809, a determination is made whether matrix instruction for the current matrix operation is complete. In the event the matrix instruction is complete, processing continues to 811. In the event the matrix instruction is not complete, processing continues to 805 where a determination is made whether additional data for the current matrix operation is ready to be loaded and processed by the matrix computational unit. In some embodiments, the process at 809 is described with respect to step 711 of FIG. 7.

In some alternative embodiments (not shown), in the event the matrix instruction is not complete, processing continues to 813 where a determination is made whether an alternate matrix operation is pending and whether data for the pending alternate matrix operation is ready to be loaded and processed by the matrix computational unit. Under this alternative embodiment, instead of completing the current matrix operation, as long as data is available, the matrix computational unit continuously alternates back and forth between two different matrix operations, as long as there are two concurrent matrix operations.

At 811, the matrix result stored in the designated accumulator is loaded into an output array. Since some embodiments store the resulting matrix using a higher bit-depth floating-point format, such as a 21-bit or 27-bit floating-point format, moving the result out of the matrix processor may require multiple move instructions. In some embodiments, the matrix result is moved into two 64-byte registers via an output array by first converting the matrix elements into 16-bit floating point values. In some embodiments, the process at 811 is described with respect to step 713 of FIG. 7. Processing loops back to step 805 where the matrix processor is ready to begin a matrix operation or to make progress on an alternate matrix operation, if pending.

In some alternative embodiments (shown as a dotted line), processing continues to 813 where a determination is made whether an alternate matrix operation is pending and whether data for the pending alternate matrix operation is ready to be loaded and processed by the matrix computational unit. Under this alternative embodiment, once the current matrix instruction is completed, the matrix computational unit switches to an alternate matrix operation in the event that there was an alternate matrix operation pending completion.

At 813, a determination is made whether an alternate matrix operation is pending and whether data for the pending alternate matrix operation is ready to be loaded and processed by the matrix computational unit. For example, in the event a second matrix operation is received at 803 while processing a first matrix operation, a second matrix operation pending completion will have issued reads for its corresponding matrix arguments. A determination is made whether there is a second alternate matrix operation pending and whether its data is ready to be loaded into the matrix computational unit. In the event the operand data for an alternate matrix operation is available, processing continues to 815. In some embodiments, the operand data are slices of larger operand matrices that are sized for the input arrays of the matrix computational unit. For the weight input array, the pending columns of elements must be ready. For the data input array, the pending rows of elements must be ready. In the event there is not a pending alternate matrix operation or the pending elements for the alternate matrix operation are not available, processing continues to 805. For example, the pending elements may not be available due to the latency from a memory read and/or a cache miss. Instead of stalling while waiting for the data to become available, the availability of the data corresponding to the current matrix operation is checked again. The first matrix operation with available data will have its data loaded into the matrix computational unit for processing.

At 815, the matrix processor including the matrix computation unit is switched to perform processing on the alternate matrix operation that is pending completion. The alternate matrix operation is now designated as the current matrix operation and the previously current matrix operation is designated as the alternate matrix operation. Since a first matrix operation may have stalled (or in some embodiments, completed), the matrix computational unit will now work on the second matrix operation that was pending completion. In various embodiments, the corresponding output accumulator is designated, as appropriate, as the source for previous intermediate results and a destination for accumulating intermediate and final results. Processing continues to 807 where computation progress is made on the newly designated current matrix operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A microprocessor system, comprising:
a matrix computational unit that includes one or more processing elements; and
a control unit configured to provide a matrix processor instruction to the matrix computational unit, wherein the matrix processor instruction specifies a floating-point operand formatted with an exponent that has been biased with a specified bias, wherein the floating-point operand is a matrix,
wherein the specified bias is configurable via the control unit using the matrix processor instruction, and wherein the matrix processor instruction specifies a floating-point number format for the floating-point operand from a group of floating-point formats.

2. The system of claim 1, wherein each element of the matrix uses an 8-bit floating-point format.

3. The system of claim 2, wherein the 8-bit floating-point format allocates 1-bit for a sign bit, 4-bits for an exponent field, and 3-bits for a mantissa field.

4. The system of claim 2, wherein the 8-bit floating-point format allocates 1-bit for a sign bit, 5-bits for an exponent field, and 2-bits for a mantissa field.

5. The system of claim 1, wherein each floating-point format of the group of floating-point formats utilizes a same total number of bits for representing a floating point number and a different number of bits for a mantissa field of the floating point number.

6. The system of claim 1, wherein the specified bias is set using a register argument stored in a register of the microprocessor system.

7. The system of claim 1, wherein the specified bias is selected from a non-consecutive set of pre-determined floating-point exponent biases.

8. The system of claim 1, wherein the control unit is configured to reconfigure the configurable bias via a subsequent matrix processor instruction.

9. The system of claim 1, wherein each of the one or more processing elements includes a floating-point multiplier and an accumulator.

10. The system of claim 1, wherein each processing element of the one or more processing elements is configured to perform a floating-point multiplication operation in parallel with the other processing elements.

11. The system of claim 1, wherein the matrix processor instruction specifies a designated accumulator for storing intermediate results of the matrix computational unit.

12. A microprocessor system, comprising:
a matrix processor, wherein the matrix processor is configured to receive a matrix processor instruction that specifies a floating-point operand formatted with an exponent that has been biased with a specified bias, wherein the floating-point operand is a matrix, wherein the matrix processor instruction specifies a floating-point number format for the floating-point operand from a group of floating-point formats, and
wherein the specified bias is configurable based on the matrix processor instruction;
a post-processing unit;
a control unit configured to provide a post-processing instruction to the post-processing unit and the matrix processor instruction to the matrix processor; and
a post-processing register file, wherein the post-processing instruction specifies an operand stored in the post-processing register file.

13. The system of claim 12, wherein the post-processing unit is a vector computational unit.

14. The system of claim 12, wherein the operand is a vector operand and the post-processing instruction specifies a data size for each vector element of the operand.

15. A method comprising:
receiving a matrix processor instruction from a control unit, wherein the matrix processor instruction specifies a floating-point operand formatted with an exponent that has been biased with a specified bias, wherein the floating-point operand is a matrix, wherein the matrix processor instruction specifies a floating-point number format for the floating-point operand from a group of floating-point formats, and wherein the specified bias is configurable based on the matrix processor instruction;
issuing one or more reads for data values of the floating-point operand;
receiving the data values of the floating-point operand; and
loading one or more received data values into a matrix computational unit.

* * * * *